US012778308B2

(12) United States Patent
Chunglo

(10) Patent No.: US 12,778,308 B2
(45) Date of Patent: Nov. 3, 2026

(54) MATTRESS ASSEMBLY WITH REDUCED HEAT INDEX

(71) Applicant: DREAMWELL, LTD., Doraville, GA (US)

(72) Inventor: Christopher Francis Chunglo, Marietta, GA (US)

(73) Assignee: DREAMWELL, LTD., Doraville, GA (US)

( * ) Notice: Subject to any disclaimer, the term of this patent is extended or adjusted under 35 U.S.C. 154(b) by 131 days.

(21) Appl. No.: 18/775,197

(22) Filed: Jul. 17, 2024

(65) Prior Publication Data

US 2024/0365991 A1 Nov. 7, 2024

Related U.S. Application Data

(63) Continuation-in-part of application No. 17/822,561, filed on Aug. 26, 2022, now Pat. No. 12,616,310.

(51) Int. Cl.

| | |
|---|---|
| ***A47C 21/04*** | (2006.01) |
| ***A47C 27/14*** | (2006.01) |
| ***A47C 31/00*** | (2006.01) |
| ***B32B 3/26*** | (2006.01) |
| ***B32B 5/02*** | (2006.01) |
| ***B32B 5/18*** | (2006.01) |
| ***B32B 5/24*** | (2006.01) |

(52) U.S. Cl.

CPC ............ *A47C 21/046* (2013.01); *A47C 27/14* (2013.01); *A47C 31/007* (2013.01); *B32B 3/266* (2013.01); *B32B 5/022* (2013.01); *B32B 5/18* (2013.01); *B32B 5/245* (2013.01); *B32B 2262/0276* (2013.01); *B32B 2264/108* (2013.01); *B32B 2307/302* (2013.01); *B32B 2307/724* (2013.01); *B32B 2307/726* (2013.01); *B32B 2307/7376* (2023.05); *B32B 2601/00* (2013.01)

(58) Field of Classification Search

CPC ..... A47C 21/046; A47C 27/00; A47C 27/144; A47C 27/148; A47C 31/006; A47C 27/22

See application file for complete search history.

(56) References Cited

U.S. PATENT DOCUMENTS

| | | | | |
|---|---|---|---|---|
| 4,798,756 | A * | 1/1989 | Fukushima | B32B 5/18 428/317.1 |
| 6,315,364 | B1 | 11/2001 | Fujita et al. | |
| 6,630,414 | B1 | 10/2003 | Matsumoto | |
| 7,235,504 | B2 | 6/2007 | Shirasaki et al. | |
| 2006/0080778 | A1 | 4/2006 | Chambers | |

(Continued)

*Primary Examiner* — Fredrick C Conley

(74) *Attorney, Agent, or Firm* — CANTOR COLBURN LLP

(57) ABSTRACT

Mattress assemblies that provide reduced heat index during use include a moisture management layer, a thermally conductive layer and an underlying spacer layer and in direct contact with the thermally conductive layer. Optionally, the thermally conductive foam layer can be perforated and sandwiched between two high air flow layers having an air flow of at least 6 ft3/min. In some embodiments, the perforated thermally conductive layer can include slits connecting adjacent perforations in a linear direction, e.g., along length dimension of mattress assembly or along width dimension of mattress assembly, which act as expansion cuts to provide greater air flow and heat dissipation. Also, disclosed are processes for reducing the heat index in a mattress assembly.

28 Claims, 8 Drawing Sheets

(56) References Cited

U.S. PATENT DOCUMENTS

| | | | | |
|---|---|---|---|---|
| 2009/0142551 | A1* | 6/2009 | Fox | B32B 5/245<br>427/331 |
| 2011/0173757 | A1* | 7/2011 | Rensink | A47C 27/15<br>5/655.5 |
| 2013/0025065 | A1* | 1/2013 | Chunglo | A47C 27/144<br>5/691 |
| 2014/0039082 | A1 | 2/2014 | Peterson et al. | |
| 2015/0026897 | A1* | 1/2015 | Chunglo | A47C 27/15<br>5/724 |
| 2015/0296993 | A1* | 10/2015 | Boyd | A47C 27/001<br>5/724 |
| 2016/0286972 | A1* | 10/2016 | DeFranks | A47C 27/15 |
| 2017/0119169 | A1* | 5/2017 | Krim | A47C 21/046 |
| 2017/0295945 | A1* | 10/2017 | Stickler | A47C 27/15 |
| 2020/0360210 | A1 | 11/2020 | Zoni, III et al. | |
| 2024/0065448 | A1 | 2/2024 | Chunglo | |

* cited by examiner

MATTRESS ASSEMBLY WITH REDUCED HEAT INDEX

CROSS REFERENCE TO RELATED APPLICATIONS

The present application is a continuation in part application of U.S. patent application Ser. No. 17/822,561 filed on Aug. 26, 2022, the contents of which are incorporated by reference in its entirety.

BACKGROUND

The present disclosure generally relates to mattress assemblies including foam layers exhibiting a reduced heat index.

Mattress assemblies including foam layers such as those formed of polyurethane foam, latex foam, and the like, are generally known in the art. One of the ongoing problems associated with mattress assemblies including foam layers in close proximity to the sleeping surface is user comfort. To address user comfort, these types of mattress assemblies are often fabricated with multiple foam layers having varying properties such as density and hardness, among others, to suit the needs of the intended user. More recently, manufacturers have employed so called memory foam, also commonly referred to as viscoelastic foams, which are generally a combination of polyurethane and one or more additives that increase foam density and viscosity, thereby increasing its viscoelasticity. These foams are often open cell foam structures having both closed and open cells but, in some instances, may be reticulated foam structures. The term "reticulated" generally refers to a cellular foam structure in which the substantially all of the membrane windows are removed leaving a skeletal structure. In contrast, open cell structures include both open cell (interconnected cells) and closed cells.

When used in a mattress, the memory foam conforms to the shape of a user when the user exerts pressure onto the foam, thereby minimizing pressure points from the user's body. The memory foam then returns to its original shape when the user and associated pressure are removed. Unfortunately, the high density of foams used in current mattress assemblies, particularly those employing memory foam layers, generally prevents proper ventilation. As a result, the foam material can exhibit an uncomfortable level of heat to the user after a period of time. Additionally, these foams can retain a high level of moisture, further causing discomfort to the user and potentially leading to foul odors. To overcome this, mattress manufacturers utilize phase change materials and/or thermally conductive materials such as graphite, metals, or the like within and/or on the foams layers to help dissipate heat. The thermally conductive material can be a composite of a carrier layer with high conductivity materials bonded to and/or impregnated in the carrier. These thermally conductive layers tend to be very good at moving heat away from a user on sleeping surface but also tend to be non-permeable, which can cause a buildup of humidity near the surface of the thermally conductive foam layer. These conductive materials need to be near the surface of the bed to be effective at moving heat away from the sleeper. The buildup of humidity near the sleeper will cause an undesirable increase in heat index and degrade the end user's sleep experience.

To reduce the buildup of humidity, mattress manufacturers have attempted to increase ventilation at the surface through the use of an overlying perforated foam layer and/or added perforations to the thermally conductive film layer. While movement of moisture will be improved as a function of the perforations, the moisture movement is still insufficient to significantly improve the sleep experience. Moreover, when an end user lays on the mattress, compression of the foam layers proximate to the sleeping surface, which typically includes the thermally conductive layer, results and serves to limit the amount of air flow through the perforations from the foam layer including the thermal conductive materials.

BRIEF SUMMARY

Disclosed herein are mattress assemblies with reduced heat index. In one embodiment, the mattress assembly includes a spacer layer underlying and in direct with a thermally conductive layer and processes for reducing heat index in a mattress assembly. In one embodiment, the mattress assembly includes an upper foam layer; a thermally conductive layer underlying and in directed contact with the upper foam layer; and a spacer layer underlying and in direct contact with the thermally conductive layer, wherein the spacer layer comprises a three-dimensional polymeric fibrous structure including substantially planar top and bottom surfaces and substantially vertically oriented fibers extending between the planar top and bottom surfaces. In one or more embodiment, the thermally conductive layer is ventilated, e.g., configurated with perforations, slits, and/or the like.

In another embodiment, the mattress assembly includes a first high airflow foam layer configured to provide an air flow equal to or greater than 6 $ft^3$/min; a perforated thermally conductive layer proximate to a sleeping surface; and a second high airflow foam layer configured to provide an air flow equal to or greater than 6 $ft^3$/min, wherein the thermally conductive layer is in direct contact with and is sandwiched between the first and second high airflow layers.

In yet another embodiment, the mattress assembly includes a first moderate airflow foam layer configured to provide an air flow equal to or greater than 2 $ft^3$/min to 5 $ft^3$/min; a perforated thermally conductive layer proximate to a sleeping surface; and a second high airflow foam layer configured to provide an air flow equal to or greater than 6 $ft^3$/min, wherein the thermally conductive layer is in direct contact with and is sandwiched between the first and second high airflow layers.

In one or more embodiments, a process for reducing heat index in a mattress assembly includes sandwiching a perforated thermally conductive layer between first and second foam layers, wherein the first high air flow layer has a moderate airflow of 2 to 5 $ft^3$/min or a high air flow of at least 6 $ft^3$/min or greater, and the second foam layer has a high air flow of at least 6 $ft^3$/min or greater; and providing the sandwiched perforated thermally conductive layer proximate to a sleeping surface within a mattress assembly, wherein the perforated thermally conductive layer comprises a thermally conductive material having a thermal conductivity greater than 5 watts per meters-Kelvin.

The disclosure may be understood more readily by reference to the following detailed description of the various features of the disclosure and the examples included therein.

BRIEF DESCRIPTION OF THE DRAWINGS

Referring now to the figures wherein the like elements are numbered alike.

Prior Art

Figure 1:
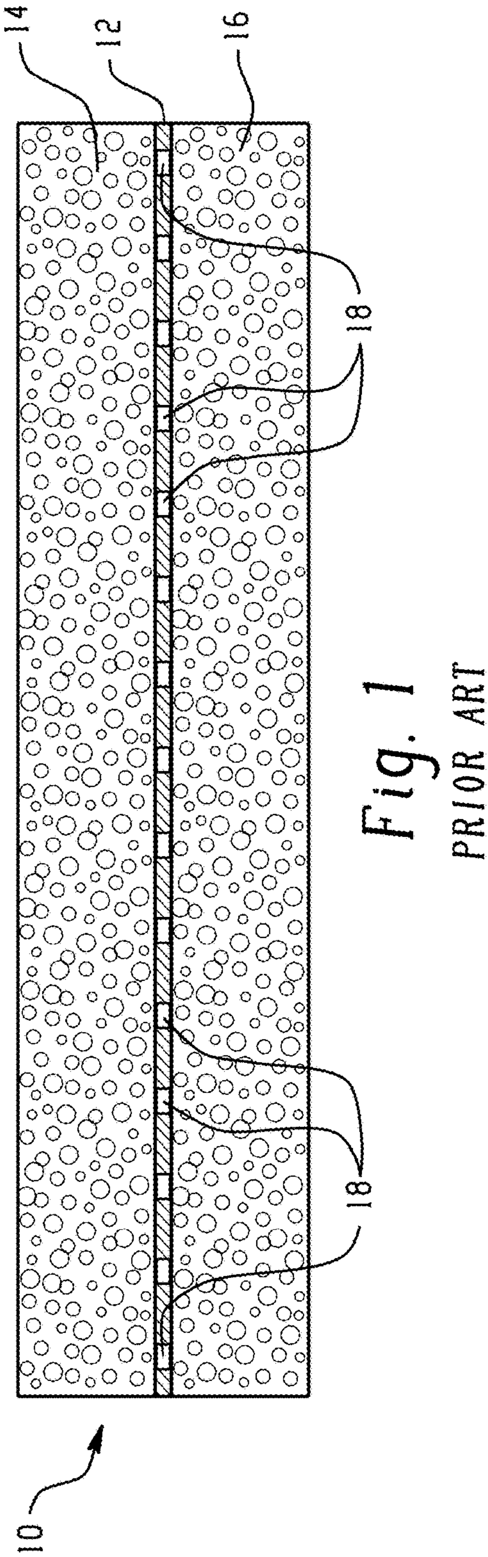
Fig. 1 PRIOR ART
FIGS. 1 and 2 depict cross sectional views of a prior art mattress assembly including a perforated thermally conductive layer sandwiched between foam layers in an uncompressed and user compressed configuration, respectively.

It should be appreciated that for simplicity and clarity of illustration, elements shown in the drawings have not necessarily been drawn to scale. For example, the dimensions of some of the elements could be exaggerated relative to other elements for purpose of clarity.

DETAILED DESCRIPTION

Disclosed herein are mattress assemblies that provide improved airflow, moisture reduction, and a reduced heat index to effectively dissipate user heat and moisture during use. Applicants have found that the heat index in mattress assemblies including a thermally conductive layer sandwiched between foam layers proximate to the sleeping surface can be markedly reduced by utilizing a spacer layer in direct contact with and underlying the thermally conductive layer so that heat and moisture can be exhausted away from the upper surface and through the spacer layer of the mattress assembly. In some embodiments, the layers above the spacer layer such as the thermally conductive layer can be perforated to further increase air flow. In other embodiments, one or more of the layers and/or surfaces thereof can also include a phase change material. In still other embodiments, a moisture management layer can be provided and configured to overly the thermally conductive layer with the spacer layer directly below the thermally conductive layer. In one or more embodiments, the thermally conductive layer is ventilated, e.g., configurated with perforations, slits, and/or the like. The moisture management layer is generally a relatively thin scrim layer configured to wick moisture away from the sleeping surface. i.e., the moisture management layer is substantially a hydrophilic porous non-woven fabric layer. The particular moisture management layer is not intended to be limited so long as it includes a moisture wicking agent or is formed of a moisture wicking material such as cotton or a hydrophilic foam, for example.

In another embodiment, the mattress assembly including a ventilated thermally conductive layer sandwiched between two foam layers exhibiting high air flow. Applicants have discovered that by sandwiching the ventilated thermally conductive layer between two foam layers exhibiting high air flow resulted in improved comfort in addition to a reduction in heat index, which is an important parameter considered by the consumer when selecting a mattress. As used herein, the term "high air flow" generally refers to foam layers configured to provide a volumetric air flow of 6 $ft^3$/min or greater. By way of example, the high airflow foam layers are reticulated foam or foam configured with perforations sufficient to provide the high airflow. The two foams layers can be the same or different.

In another embodiment, the mattress assembly including a ventilated thermally conductive layer sandwiched between two foam layers. The lower layer has high air flow. The upper layer has moderate air flow. Applicants have discovered that by using high airflow below the thermal conductive layer it maximized the performance of the system while using a moderate air flow above the thermally conductive layer can maximize comfort with some diminishing of performance. This allows the use of foams that may supply additional comfort to the consumer at the surface of the bed. As used herein, the term "high air flow" generally refers to foam layers configured to provide a volumetric air flow of 6 $ft^3$/min or greater. Moderate airflow generally refers to a foam with a 2 to 5 $ft^3$/min volumetric air flow. By way of example, the high airflow foam layers are reticulated foam or foam configured with perforations sufficient to provide the high airflow. The two foams layers can be the same or different.

Detailed embodiments of the mattress assemblies according to aspects of the present invention will now be described herein. However, it is to be understood that the embodiments of the disclosure described herein are merely illustrative of the structures that can be embodied in various forms. In addition, each of the examples given in connection with the various embodiments of the invention is intended to be illustrative, and not restrictive. Further, the figures are not necessarily to scale, some features can be exaggerated to show details of particular components. Therefore, specific structural and functional details described herein are not to be interpreted as limiting, but merely as a representative basis for teaching one skilled in the art to variously employ the methods and structures of the present description. For the purposes of the description hereinafter, the terms "upper", "lower", "top", "bottom", "left," and "right," and derivatives thereof shall relate to the described structures, as they are oriented in the drawing figures. The same numbers in the various figures can refer to the same structural component or part thereof.

As used herein, the articles "a" and "an" preceding an element or component are intended to be nonrestrictive regarding the number of instances (i.e. occurrences) of the element or component. Therefore, "a" or "an" should be read to include one or at least one, and the singular word form of the element or component also includes the plural unless the number is obviously meant to be singular.

As used herein, the terms "invention" or "present invention" are non-limiting terms and not intended to refer to any single aspect of the particular invention but encompass all possible aspects as described in the specification and the claims.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

As used herein, the term "about" modifying the quantity of an ingredient, component, or reactant of the invention employed refers to variation in the numerical quantity that can occur, for example, through typical measuring and liquid handling procedures used for making concentrates or solutions. Furthermore, variation can occur from inadvertent error in measuring procedures, differences in the manufacture, source, or purity of the ingredients employed to make the compositions or carry out the methods, and the like. In one aspect, the term "about" means within 10% of the reported numerical value. In another aspect, the term "about" means within 5% of the reported numerical value. Yet, in another aspect, the term "about" means within 10, 9, 8, 7, 6, 5, 4, 3, 2, or 1% of the reported numerical value.

It will also be understood that when an element, such as a layer, region, or substrate is referred to as being "on" or "over" another element, it can be directly on the other element or intervening elements can also be present. In contrast, when an element is referred to as being "directly on" or "directly over" another element, there are no intervening elements present, and the element is in contact with another element.

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

As used herein, the term "spacer layer," also commonly referred to by those skilled in the art as "spacer fabric", is an extruded three-dimensional polymeric matrix having multiple layers of varying materials in a sandwiched configuration. The spacer layer can be of a sufficient thickness and have suitable compressive properties (e.g., resilience and/or resistance) for providing some cushioning effect when used in conjunction with a mattress, mattress topper, or other cushioning element. The spacer layer generally includes multiple and randomly oriented fibers, i.e., monofilaments, extending from a top surface to a bottom surface. The spacer layer can have a free volume greater than 50% or more and can be formed of an elastomeric material that maintains its original shape subsequent to compression. Moreover, when compressed, the spacer layer generally maintains a percentage of free volume such that air flow through the layer is maintained via reduced localized buckling, which is unlike compression of foams that can undergo complete collapse of the pores and/or cells and/or tortuous pathways within the foam layer depending on the compressive load.

Figure 2:
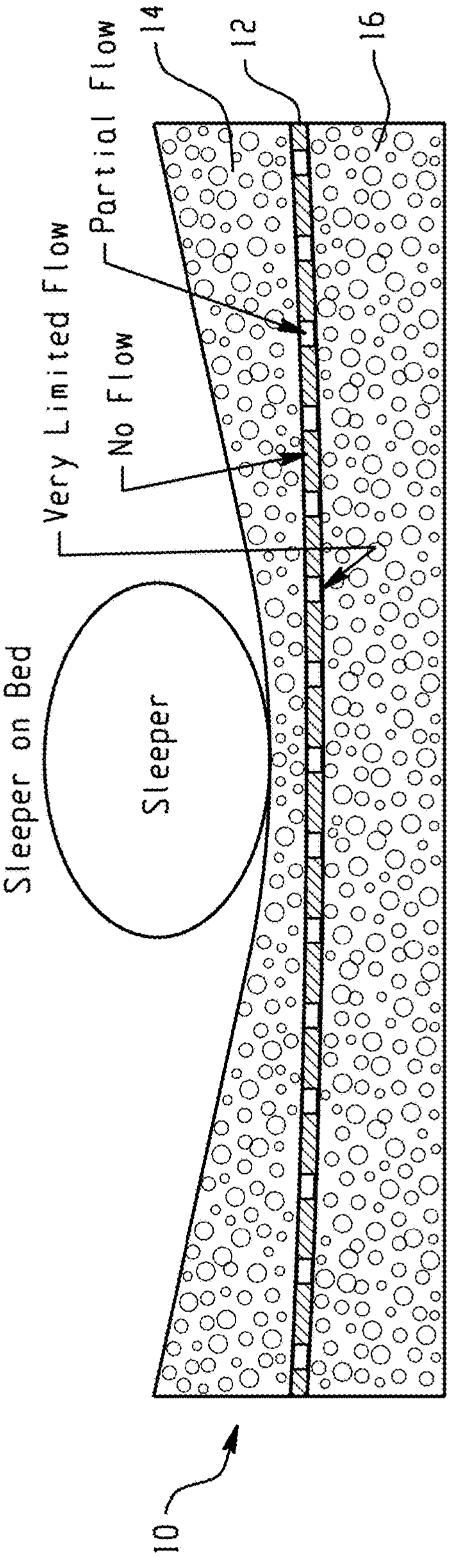
Fig. 2 PRIOR ART

PRIOR ART FIGS. 1 and 2 illustrate cross sectional views of a prior art mattress assembly including a perforated thermally conductive layer sandwiched between foam layers proximate to a sleeping surface thereof with and without an applied load of an end user thereon, respectively. The mattress assemblies, generally designated by reference numeral 10, include a perforated thermally conductive layer 12 sandwiched between an upper foam layer 14 and a lower layer 16. As shown, the thermally conductive layer 12 includes multiple perforations 18 across the layer extending from a top surface to a bottom surface. The thermally conductive layer 12 is can a foam layer although in some prior art embodiments, the thermally conductive layer can be a foil or a composite film.

The upper foam layer 14 can be the uppermost layer and is often referred to as a cover layer. The upper foam layer 14 generally has a planar top surface adapted to substantially face the user resting on the mattress assembly and having a length and width dimensions sufficient to support a reclining body of the user. The lower surface can be a planar surface or a convoluted surface. The upper foam layer 14 is relatively thin so that the presence of the underlying thermally conductive layer can effectively wick heat from the sleeping surface during use by an end user thereon to provide the end user with reduced heat buildup as a consequence of the well-known insulative properties of foam.

The lower layer 16 can be a foam layer or an innerspring mattress core.

Other than optional perforations (i.e., through holes), the non-perforated portions of the thermally conductive layer 12 are generally not permeable due to the presence of the thermally conductive material within and/or on the non-perforated portion, which can cause buildup of moisture during use by the end user near the surface of the thermally conductive layer. The buildup of moisture near the surface causes a subsequent increase in heat index, which degrades the end users' sleep experience. To overcome this, some manufacturers have provided perforations in the thermally conductive layer as is generally shown. However, Applicants have discovered that the subsequent compression of the foam layers proximate to the sleeping surface as shown in the mattress assembly depicted in PRIOR ART FIG. 2 compacts the layers directly underneath the end user restricting air flow in the non-perforated portions. Moreover, in the peripheral areas about the end user, the non-perforated portions will still restrict air flow and the air flow passages provided by the perforations will become somewhat restricted/narrowed due to the compression from the end user. Still further, the compression can also affect the lower layer underlying the thermally conductive layer, even if the lower layer is a foam having an open cell foam structure. The compression of these layers deleteriously affects airflow. As a result, heat index due to moisture buildup about the surface of the thermally conductive layer remains and causes an increase in heat index.

In the present disclosure, Applicants have found that providing a spacer layer as will be described in greater detail herein directly under and in contact with the thermally conductive layer substantially reduces moisture buildup during use and provides a markedly lower heat index than the prior art mattress assemblies. Optionally, a moisture management layer may be disposed over the thermal conductive layer. The moisture management layer is relatively thin to minimize insulative effects as it relates to the thermally conductive layer. By way of example, the moisture management layer can be a scrim layer including a moisture wicking material or can be fabricated from a moisture wicking material. In other embodiments, Applicants have found that sandwiching a ventilated thermally conductive layer between two high air flow foam layers provides improved comfort while dissipating heat index and reducing moisture buildup. Advantageously, the latter embodiment simplifies construction since moisture buildup is reduced without the presence of the moisture management layer.

Figure 3:
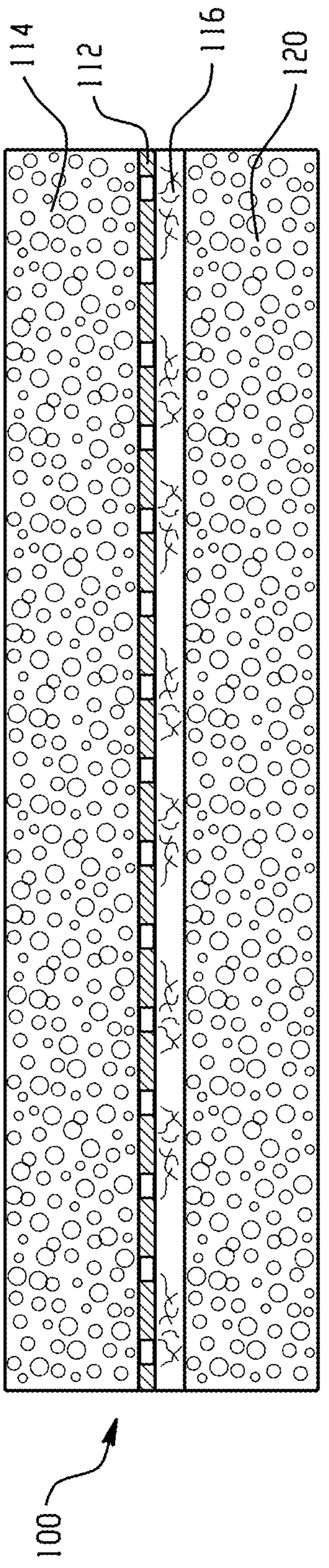
FIGS. 3 and 4 depict cross sectional views of an exemplary mattress assembly in accordance with the present disclosure in an uncompressed and user compressed configuration, respectively.
Figure 4:
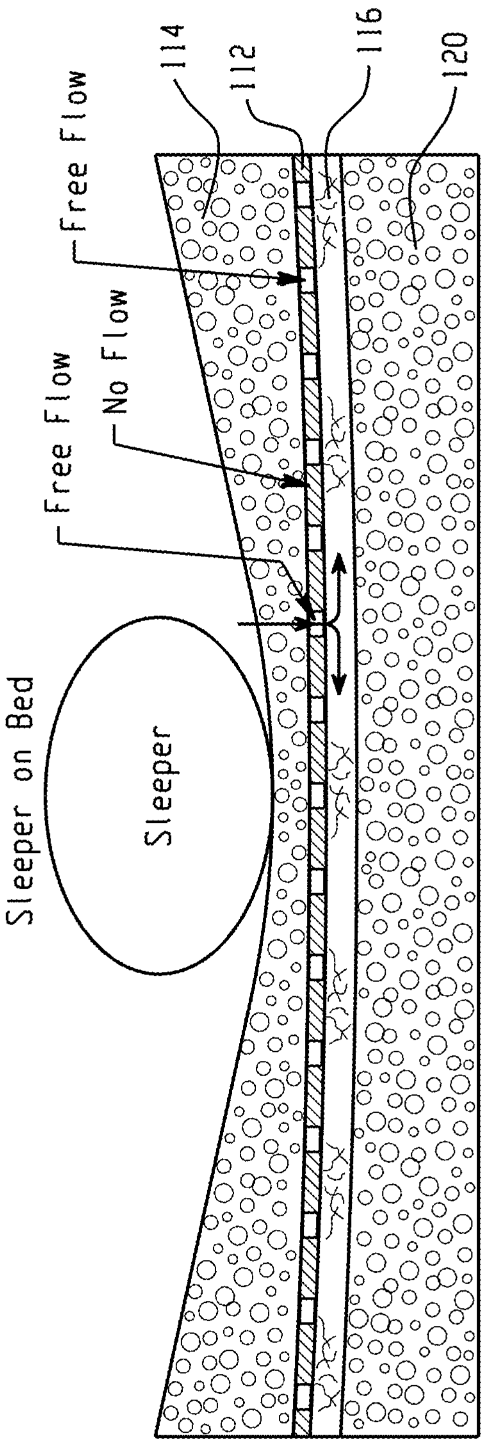

Turning now to FIGS. 3 and 4, there are depicted cross-sectional views of mattress assemblies 100 in accordance with the present disclosure that include a thermally conductive layer 112 sandwiched between an upper foam layer 114 and a lower spacer layer 116 in direct contact with and underlying the thermally conductive layer 112. The thermally conductive layer 112 can be perforated as shown or non-perforated depending on the intended mattress application. The perforations can be of any shape, e.g., geometric shapes, slits, slots, combinations thereof, or the like. The tri-layer arrangement as described can be provided on one or more underlying foam layers (layer 120) to define a mattress assembly in its entirety or on an underlying mattress core including an innerspring unit to form the mattress assembly or on a hybrid structure of foam and innerspring coils defining the mattress assembly.

As noted above, the spacer layer 116 is an extruded three-dimensional polymeric fiber layer that includes a plurality of random polymeric fibers that can bond at intersections between fibers and generally extend between a top planar surface and a bottom planar surface of the spacer layer. The spacer layer 116 has a free volume that is generally greater than 50%. Relative to foams, the spacer layer 116 is not a foam and does not include defined cells or pores. Instead, the spacer layer 116 generally includes fibers, i.e., monofilaments, that randomly connect opposing fibers defining the outer planar (porous) surfaces of the spacer layer 116 to form the three-dimensional structure. Because of the lower elasticity caused by the increased stiffness of the monofilaments extending and/or intersecting between the two surfaces, the microclimate upon compression such as provided by an end user during use thereof is maintained unlike foams. Consequently, moisture does not buildup near the surface of the thermally conductive layer 112 upon compression but instead can advantageously flow further from the sleeping surface to a layer underlying the spacer layer 116, which has been found to markedly reduce the heat index.

Generally, the spacer layer 116 is formed by extruding the desired three dimensional polymeric fibers. Granules, pellets, chips, or the like of a desired polymer along can be fed into an extrusion apparatus, i.e., an extruder, at an elevated temperature and pressure, which is typically greater than the melting temperature of the polymer. The polymer, in melt form, is extruded through a die, which generally is a plate including numerous spaced apart apertures of a defined diameter, wherein the placement, density, and the diameter of the apertures can be the same or different throughout the plate. When different, the three-dimensional polymeric fiber matrix layer can be made to have different zones of density, e.g., sectional areas can have different amounts of free volume per unit area. For example, the three dimensional polymeric fiber matrix layer can include a frame-like structure, wherein the outer peripheral portion has a higher density than the inner portion; or wherein the three dimensional polymeric fiber layer has a checkerboard-like pattern, wherein each square in the checkerboard has a different density than an adjacent square; or wherein the three-dimensional polymeric fiber layer has different density portions corresponding to different anticipated weight loads of a user thereof. The various structures of the extruded three-dimensional polymeric fiber are not intended to be limited and can be customized for any desired application. In this manner, the firmness, i.e., indention force deflection, and/or density of the extruded three-dimensional polymeric fiber matrix layer can be uniform or varied depending on the die configuration and conveyor speed.

The polymer is extruded into a cooling bath, which results in entanglement and bonding of polymeric fibers through entanglement. Concurrently, the continuously extruded, cooled polymeric matrix is pulled onto a conveyor. The rate of conveyance and cooling bath temperature can be individually varied to further vary the thickness and density of the three-dimensional polymeric fiber matrix layer. Generally, the thickness of the extruded three-dimensional polymeric fiber matrix layer can be extruded as a full width mattress material.

In other embodiments, the spacer layer 116 is fabricated using additive manufacturing techniques.

The polymer in the spacer layer 116 may be formed from polyesters, polyethylene, polypropylene, nylon, elastomers, copolymers and its derivatives, including monofilament or bicomponent filaments having different melting points. In one example, the polymer is an engineered polyester material. An exemplary polymer fiber structure according to this disclosure is formed of core polyester fibers that are sheathed in a polyester elastomer binder.

Figure 5:
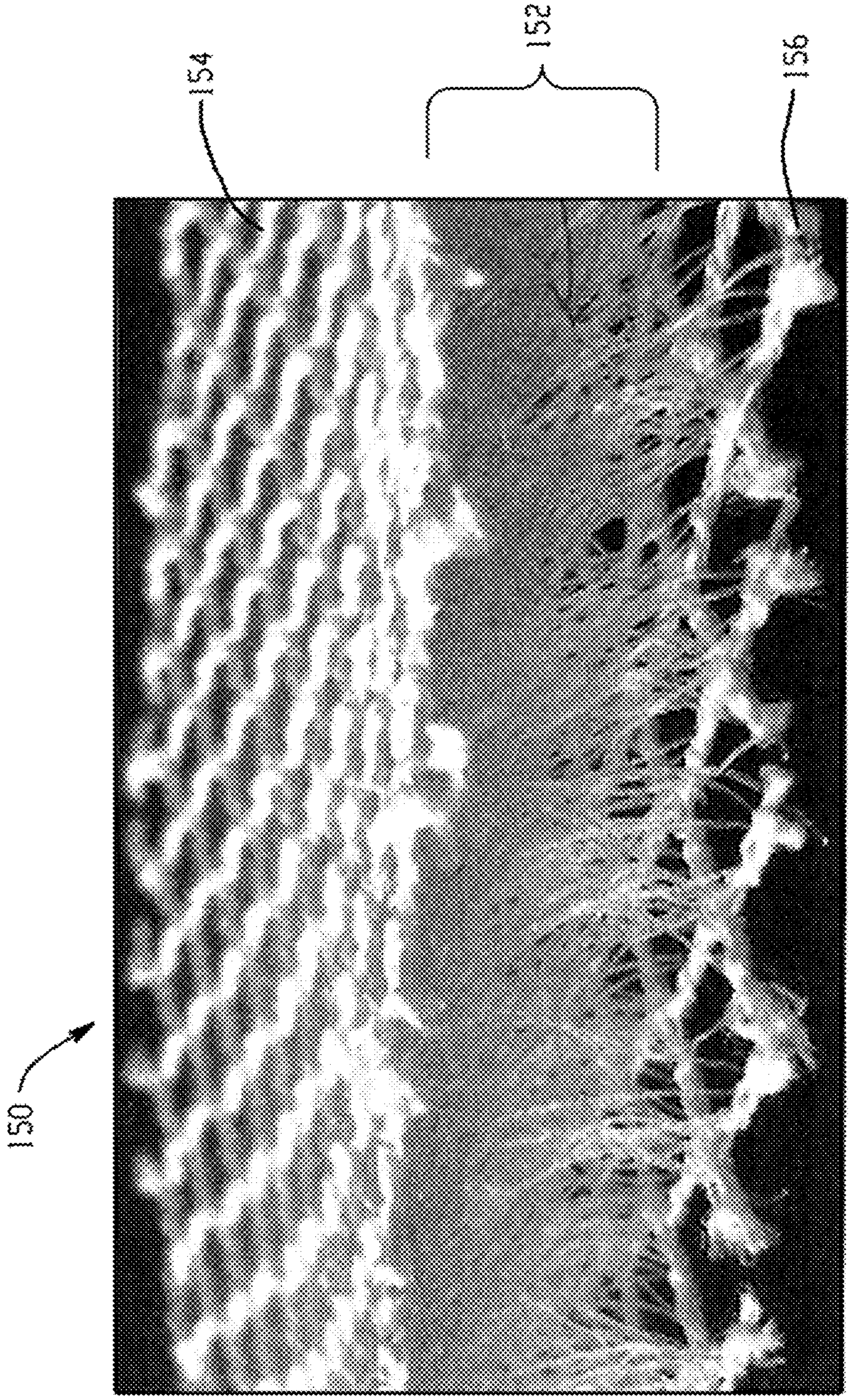
FIG. 5 pictorially illustrates a cross sectional view of an exemplary spacer layer for use in the mattress assemblies in accordance with an embodiment of the present disclosure.

FIG. 5 pictorially illustrates a perspective view of an exemplary spacer layer 150 generally showing a plurality of microfilaments 152 spanning between a substantially planar upper surface 154 of a polymer fiber network and a substantially planar lower surface 156 of a polymer fiber network. The illustrated spacer layer 150 has a substantially uniform thickness. Although both outer surfaces 154, 156 generally have similar checkerboard configurations, it should be apparent that the outer surface configurations are generally limitless and can be the same or different. Moreover, although the fibers/filaments 152 are illustrated as being substantially vertically oriented between the two surfaces 154, 156, in some embodiments, the fibers/filaments 152 can be angled and bonded at points of intersections with other fibers/filaments 152. Likewise, the diameter of the fibers/filaments 152 can be varied to provide the spacer layer 150 with a desired amount of compression for an intended load application. Also, in one or more embodiments, the thickness of the spacer layer 150 is generally not limited and can be within a range of about 0.125 inches to about 6 inches. In other embodiments, the thickness can range from about 0.25 inches to about 4 inches, and in still other embodiments, the thickness can range from about 0.5 inches to about 3 inches.

The thermally conductive layer in the mattress assemblies according to the present disclosure can be formed of foam and includes a plurality of thermally conductive particles embedded therein and dispersed throughout the foam layer and/or a foil on a surface there of.

The thermally conductive particles and/or foil can be formed of metals, metal oxides, polymers, inorganic compounds and the like. By way of example, suitable thermally conductive materials may be made of carbon, graphene, graphite, platinum, aluminum, diamond, gold, silver, silicon, tin, copper, iron, nickel, chromium, vanadium, tungsten and the like or made from any of those materials combined with oxygen, halogens, carbon, or silicon, or any combination thereof; polymers such as stretched polyethylene nanofibers: and the like, and mixtures thereof. Particles can be in the form of fibers, powder, flakes, needles, and the like and are generally dispersed within the foam layer.

In most embodiments, the selected thermally conductive material has a thermal conductivity greater than 5 watts per meters-Kelvin (W/m*K). By way of example, aluminum has a thermal conductivity of about 235 W/m*K; stretched polyethylene fibers is estimated to be about 180 W/m*K, and graphene has a theoretical conductivity of about 5000 W/m*K. In contrast, foams utilized in mattresses by themselves are typically insulating having thermal conductivity values of about 0.06 W/(m K) or less.

Exemplary foams include polymeric elastomers including, but are not limited to, polyurethane foams, latex foams including natural, blended and synthetic latex foams; polystyrene foams, polyethylene foams, polypropylene foam, polyether-polyurethane foams, and the like. Likewise, the foam can be selected to be viscoelastic or non-viscoelastic foams. Some viscoelastic foam materials are also temperature sensitive, thereby enabling the foam layer to change hardness/firmness based in part upon the temperature of the supported part, e.g., person. Unless otherwise noted, any of these foams may be open celled or closed cell or a hybrid structure of open cell and closed cell. Likewise, the foams can be reticulated, partially reticulated or non-reticulated foams. The term "reticulation" generally refers to removal of cell membranes to create an open cell structure that is open to air and moisture flow. Still further, the foams may be gel-infused in some embodiments in addition to the incorporation of the thermally conductive fibers. These same materials can be used for any of the foam layers in the mattress assembles of the present disclosure that do not include the thermally conductive fibers incorporated therein, e.g., in the case of a foam base core layer, the layer may be composed of polyurethane foam, wherein the upper foam layer is a viscoelastic foam layer.

The various foams suitable for use in the thermally conductive polymeric foam layer or elsewhere may be produced according to methods known to persons ordinarily skilled in the art. For example, polyurethane foams are typically prepared by reacting a polyol with a polyisocyanate in the presence of a catalyst, a blowing agent, one or more foam stabilizers or surfactants and other foaming aids. The gas generated during polymerization causes foaming of the reaction mixture to form a cellular or foam structure. Latex foams are typically manufactured by the well-known Dunlap or Talalay processes. The thermally conductive fibers can be added during polymerization, prior to curing, prior to forming the voids, or the like. Manufacturing of the different foams are well within the skill of those in the art. It should be apparent to those skilled in the art of foam manufacturing that the distribution of the thermally conductive materials may be heterogeneous, homogenous, stratified, or the like. By way of example, a homogenous distribution would maintain a thermal gradient through the thickness of the layer providing a pathway for heat transfer for the surface closest to the sleeping surface to the interior, i.e., towards the base core layer. An example of a heterogeneous structure, e.g., stratified, may include heavier loading of the conductive filler or stabilizer at a surface of the polymer material. This implementation would provide improved thermal transfer across the surface of the polymer layer.

The thickness of the thermally conductive layer 112 is not intended to be limited and is generally less than 3 inches. In other embodiments, the thermally conductive layer 112 is less than 2 inches and in still other embodiments, the thickness is less than 1 inch. If a thermally conductive film or foil is used as the conductive layer 112 the thickness can be less than 0.125 inches. Optionally, the thermally conductive layer 112 can be perforated.

In one or more embodiments, the upper foam layer 114 can be formed of a viscoelastic polyurethane foam. The viscoelastic polyurethane foam can have an open cell structure and has planar top and bottom surfaces. The thickness of the upper layer is generally less than 3" in some embodiments, less than 2" in other embodiments, and less than 1 inch in still other embodiments. The density of the upper foam layer is less than 6 lb/ft$^3$ in some embodiments, and less than 2.5 lb/ft$^3$ in other embodiments. In one embodiment, the hardness is generally less than 15 pounds-force.

The different properties for each layer including foam may vary depending on the intended application. The different properties include, but are not limited to, density, hardness, thickness, support factor, flex fatigue, air flow, various combinations thereof, and the like. Density is a measurement of the mass per unit volume and is commonly expressed in pounds per cubic foot. By way of example, the density of the each of the foam layers can vary. In some embodiments, the density decreases from the lower most individual layer to the uppermost layer. In other embodiments, the density increases. In still other embodiments, one or more of the foam layers can have a convoluted surface. The convolution may be formed of one or more individual layers with the foam layer, wherein the density is varied from one layer to the next. The hardness properties of foam are also referred to as the indention load deflection (ILD) or indention force deflection (IFD) and are measured in accordance with ASTM D-3574. Like the density property, the hardness properties can be varied in a similar manner. Moreover, combinations of properties may be varied for each individual layer. The individual layers can also be of the same thickness or may have different thicknesses as may be desired to provide different tactile responses.

The hardness (i.e., indention load deflection, (ILD)) of any of the foam layers in the mattress assembly can range from 7 to 25 pounds force for viscoelastic foams and from 7 to 55 pounds force for non-viscoelastic foams. ILD can be measured in accordance with ASTM D 3575. The density of the layers can generally range from about 1 to 2.5 pounds per cubic foot for non-viscoelastic foams and 1.5 to 7 pounds per cubic foot for viscoelastic foams.

Figure 6:
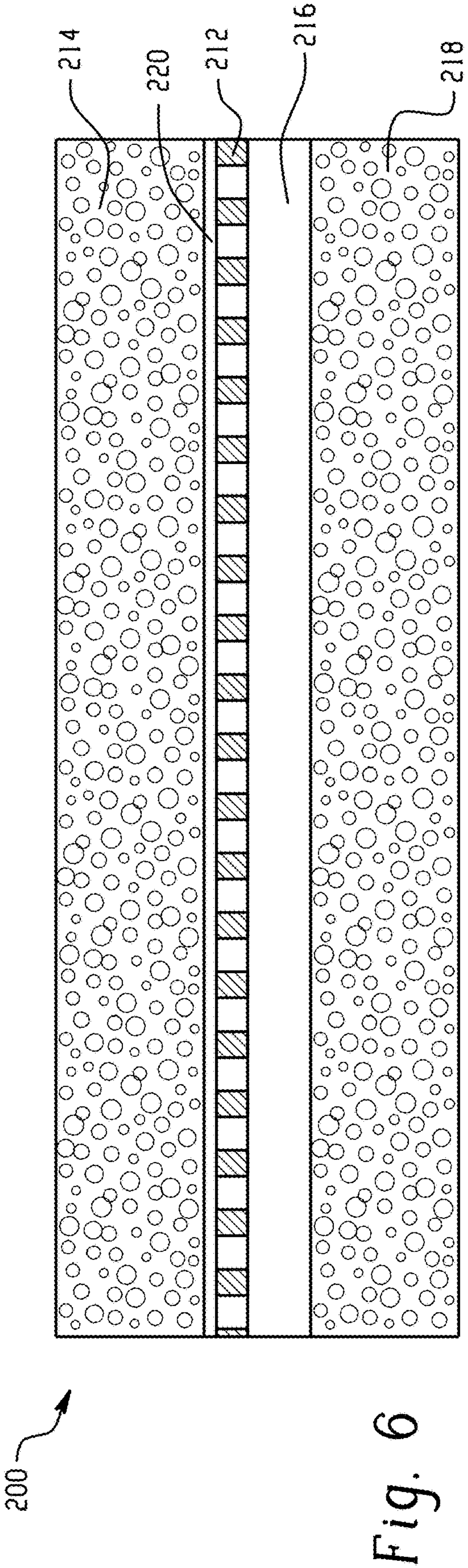
FIG. 6 depicts a cross sectional view of an exemplary mattress assembly including an optional moisture management layer in accordance with the present disclosure in an uncompressed configuration.

FIG. 6 depicts a cross sectional view of an exemplary mattress assembly 200 including a moisture management layer in accordance with the present disclosure in an uncompressed configuration. The mattress assembly 200 includes an upper foam layer 214, a moisture management layer 220 overlying and in direct contact with a thermally conductive layer 212 and a lower spacer layer 216 in direct contact with and underlying the thermally conductive layer 112. The thermally conductive layer 112 can be perforated as shown or non-perforated depending on the intended mattress application. The perforations can be of any shape, e.g., geometric shapes, slits, slots, combinations thereof, or the like. The moisture management layer 220 can be a scrim layer including a moisture wicking material or can be fabricated from a moisture wicking material, e.g., a non-woven cotton. In one or more embodiments, the thickness is generally less than 0.1 inches. In other embodiments, the thickness is generally less than 0.01 inches. In one or more embodiments, the thermally conductive layer is a foil.

The mattress assembly 200 can be provided with one or more overlying and/or underlying foam layers (such as layer 120 shown in FIG. 3, for example) to define a mattress assembly in its entirety or can be disposed on an underlying mattress core including an innerspring unit to form the mattress assembly or disposed on a hybrid structure of foam and innerspring coils defining the mattress assembly. Layer 218 can define a mattress assembly in its entirety or can be disposed on an underlying mattress core including an innerspring unit to form the mattress assembly or can be disposed on a hybrid structure of foam and innerspring coils defining the mattress assembly.

Figure 7:
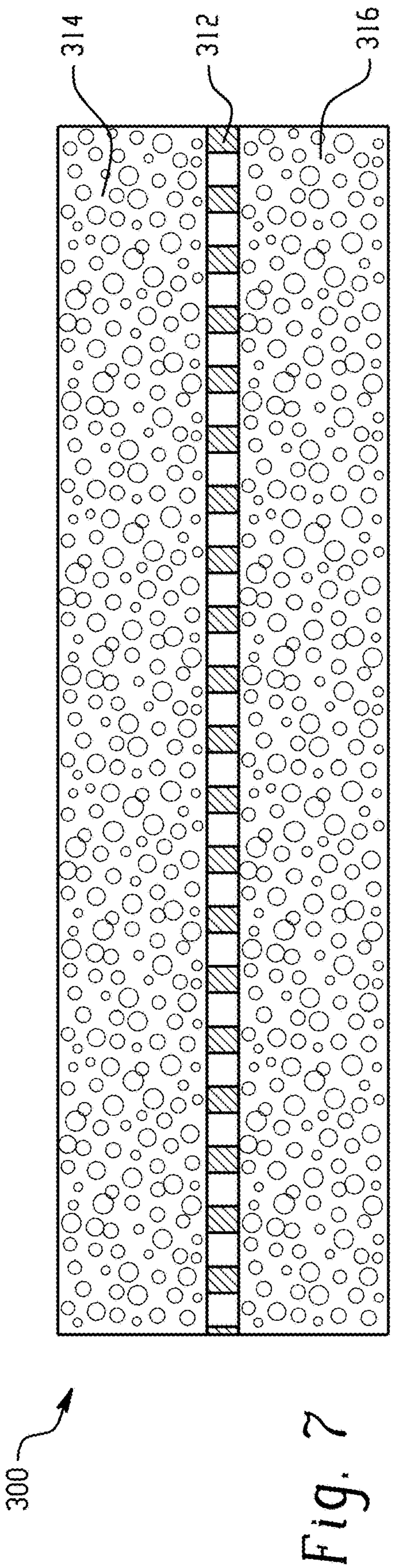
FIG. 7 depicts a cross sectional view of an exemplary mattress assembly including a thermally conductive layer sandwich between two high air flow foam layers in accordance with the present disclosure.

FIG. 7 depicts cross sectional view of an exemplary mattress assembly 300 including a thermally conductive layer 312 sandwich between two high air flow foam layers. The high air flow foam layers are configured not provide an air flow of 6 $ft^3$/min or greater. The high air flow can be provided by reticulating the foam, by providing air passages, or in place of foam, utilizing more porous materials, e.g., a fibrous layer or the like. The term "reticulated" generally refers to a cellular foam structure in which the substantially all of the membrane windows are removed leaving a skeletal structure. In contrast, open cell structures include both open cell (interconnected cells) and closed cells.

Advantageously, sandwiching the thermally conductive layer 312 between high air flow layers 314 and 316 (or between a medium air flow layer and a high air flow layer) simplifies mattress construction and can be constructed without the moisture management layer utilized in other embodiments described above. Moreover, Applicants have found the moderate and high air flow foam layers to be easier to handle and position relative to the spacer layer utilized in other embodiments.

Figure 8:
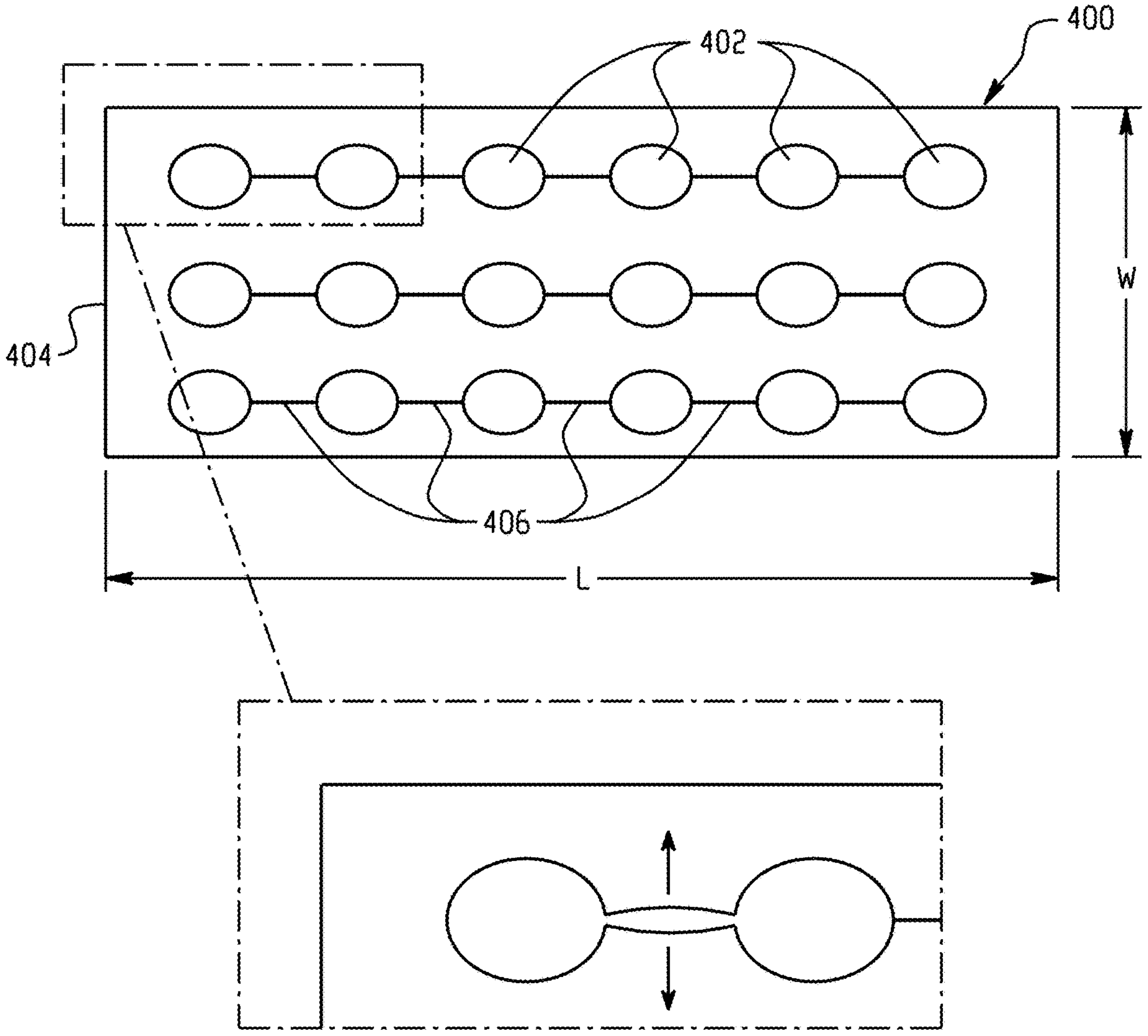
FIG. 8 illustrates a top-down view of an exemplary thermally conductive layer including expansion cuts between linearly oriented adjacent circularly shaped perforations in accordance with the present disclosure.

As previously discussed, the thermally conductive layer can be in the form of a foil in the mattress assemblies described above in the different embodiments. In FIG. 8, there is depicted a top-down view of an exemplary ventilated thermally conductive foil layer 400. The ventilated thermally conductive foil layer 400 can include, for example, a plurality of circularly-shaped perforations 402 formed in the foil 404. Optionally, expansion cuts in the form of slits 406 may be provided between adjacent circularly-shaped perforations 402 in one linear direction, e.g., the length direction (head end-to-foot end) or width direction (side-to-side) of the mattress assembly. As shown in the enlarged view of ventilated thermally conductive layer 312, the presence of the slit allows the layer to flex since the thermally conductive foil by itself generally does not stretch in response to an applied load such as when an individual is positioned on the mattress assembly, which, in turn, does not allow the user to sink into the mattress assembly. The lack of flex in the foil layer provides the user with the sensation that a board-like object is present. By providing expansion cuts between the perforations, the slits open upon an applied load to provide improved feel and a reduction in pressure points.

Figure 9:
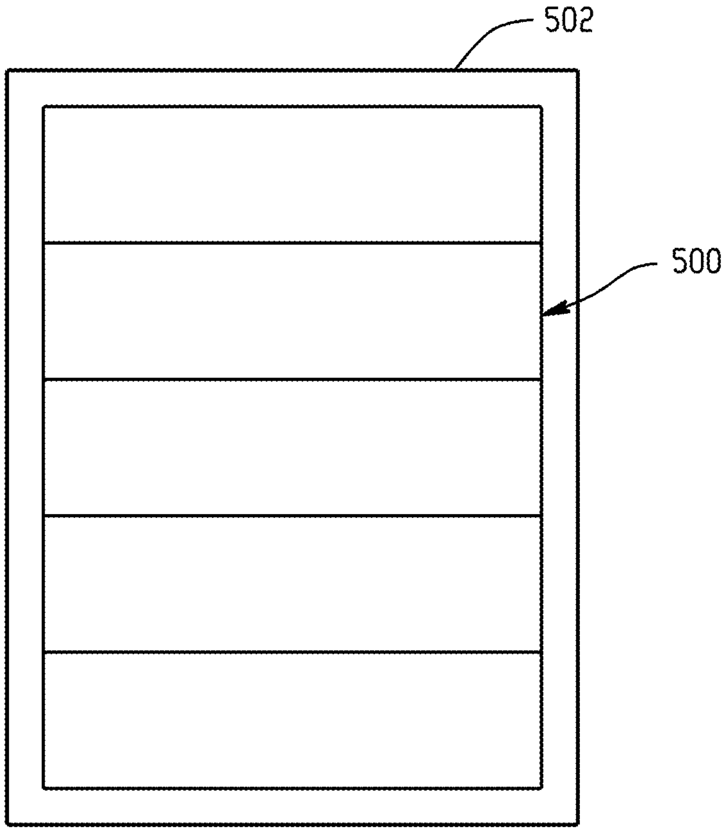
FIG. 9 illustrates a top-down view of a foam layer including a glue pattern deposited thereon prior to deposition of the ventilated thermally conductive foil layer thereon in accordance with the present disclosure.

To ensure that the expansion cuts 406 open during, the glue patterns for adhesively attaching the foil layer to an underlying layer are altered such that the glue does not inhibit function of the expansion cuts. Typical glue patterns extend from the head end to the foot end, which would bind the expansion cuts assuming the expansion cuts are provided in a similar linear direction between adjacent perforations. In FIG. 9, the glue pattern 500 on an underlying layer 502 is changed to provide a side-to-side pattern as shown. The ventilated thermally conductive foil layer (not shown) including the expansion cuts is then provided onto glue pattern 500 on the underlying layer 502, which eliminates any potential binding that may have occurred with prior glue patterns. Also, by adhesively affixing the ventilated thermally conductive foil layer in this manner, the mattress assembly can be configured for bed in the box applications that require the mattress to be folded, rolled and compressed for packaging.

Example 1

In this example, average heat index as a function of time was measured for various mattress assemblies provided on a standard foundation. The various mattress assemblies included a perforated thermally conductive layer sandwiched between foam layers, and mattress assemblies including a perforated thermally conductive layer sandwiched between foam layers and a spacer layer underlying and in direct contact with the thermally conductive layer. In each of the mattress assemblies, the upper foam layer was a viscoelastic foam layer having a thickness of ½ inch to 1 inch, an ILD of 8, and a density of 2.3 pounds per cubic foot. The thermally conductive layer was the same in each mattress assembly and included a ventilated thermally conductive film having a thickness of 0.0625 inches. Particles of carbon in the form of graphite and graphene were uniformly dispersed throughout the layer and the layer further included 1-inch perforations unfirmly spaced throughout the layer at about a 1-inch spacing. The spacer layer was a 100% polyester fiber layer having a thickness of 5 millimeters commercially available from Eastex Products, Inc. under the tradename Breathable Airmesh. The spacer layer included two opposing fabric coverings having a diamond-like surface connected with filaments.

Figure 10:
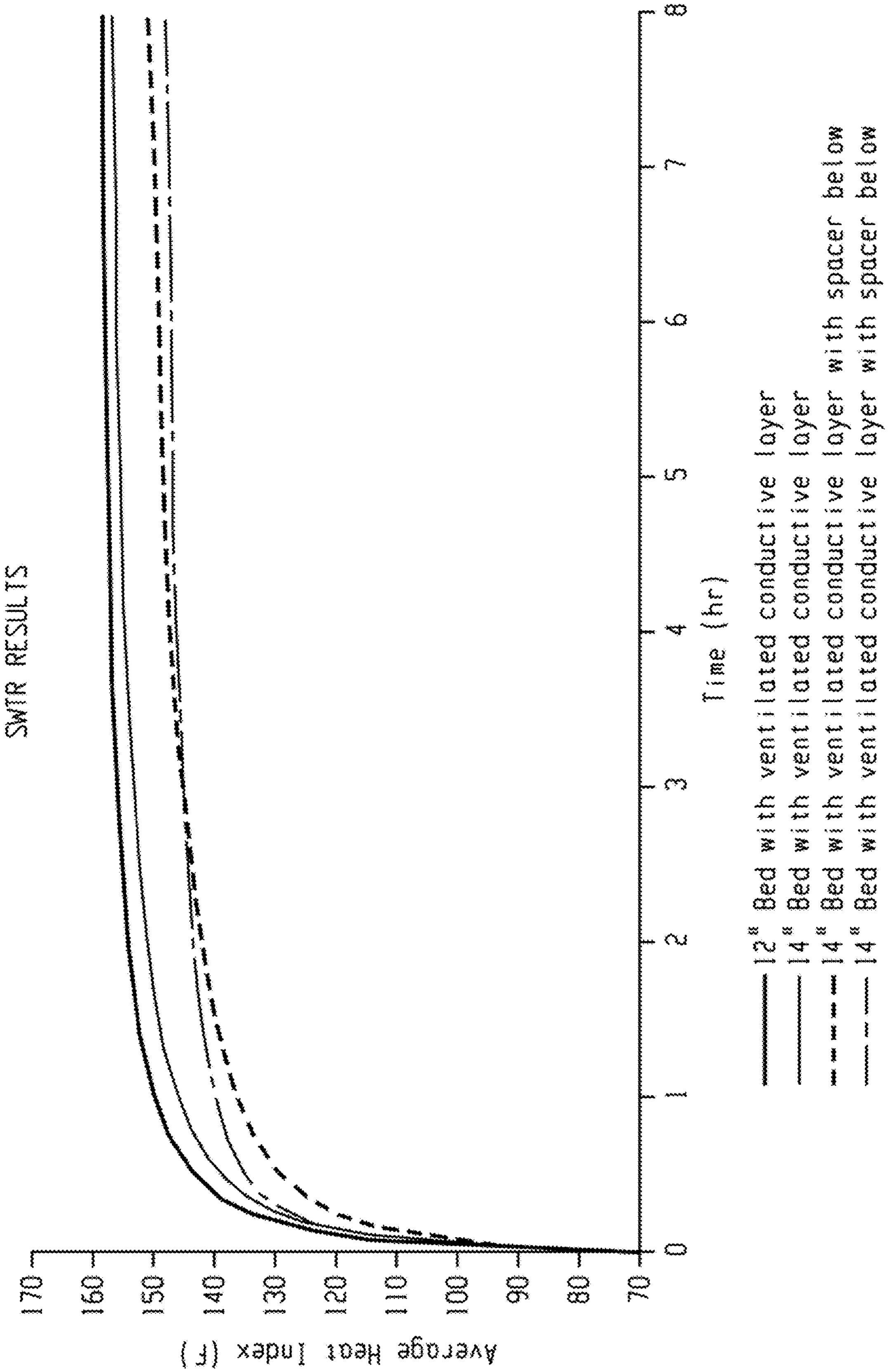
FIG. 10 graphically illustrates average heat index as a function of time comparing prior art mattress assemblies and mattress assemblies in accordance with the present disclosure.

Average heat index was measured for the various mattress assemblies with and without the spacer layer using a FluxDAQ heat flux sensor and thermocouple measurement system commercially available from FluxTeq. The sensors were provided on surfaces of each test mattress to evaluate the microclimate that a sleeper might experience during use. A guarded hot plate including an 11.25 pound weight was placed on a sleeping surface for each mattress being tested and was heated to 98° F. The guarded hot plate was configured to leak a controlled amount of moisture as a function of time to simulate the lower back of an end user, which is considered the sweatiest part of the body. For each mattress, the arrangement was then covered with a 300-thread count cotton flat sheet and two fleece blankets. The measurement system recorded data from the temperature and humidity sensors for a period of 8 hours. The data is graphically presented in FIG. 10.

As shown, mattress assemblies without the spacer layer were greater than 10 degrees Fahrenheit (° F.) hotter at the end of an 8-hour period than mattress assemblies including the spacer layer underlying and in directed contact with the thermally conductive layer. It is believed that the mattress assemblies including the perforated thermally conductive layer sandwiched between foam layers compressed under the end users' weight (load) and did not permit movement of humidity and heat, resulting in a marked increase in heat index to the end user in a fairly short period of time that extended throughout the test period of 8 hours. In contrast, mattress assemblies including the spacer layer more effectively prevented heat and humidity build up under load allowing the heat and humidity to freely flow within the spacer layer and into the underlying layers. Surprisingly, the perforations in the thermally conductive layer were less restricted with the underlying spacer layer being present in the mattress assembly.

Example 2

In this example, three mattress assemblies were constructed to include the same thermally conductive layer and other additional layers not described below with respect to each mattress assembly. A first mattress assembly included 1 inch high airflow foam layer sandwiching the thermally conductive layer on top and bottom; a second mattress assembly included a 1 inch high air flow foam layer on top of the thermally conductive layer and 2 inches below the thermally conductive layer; and a third mattress assembly including, from top to bottom, the following layers: a foam layer, a moisture management layer, the thermally conductive layer, and a spacer layer underlying and in directed contact with the thermally conductive layer. The moisture management layer was provided by the Pratrivero Nonwovens, Italy and was a thin nonwoven fabric that was treated with a wicking agent. The fiber content was –100% polyester and the wicking agent was commercially obtained from Piedmont Chemicals under the trade name Pomowick PES. The total weight 100 $g/m^2$+/–10%.

Figure 11:
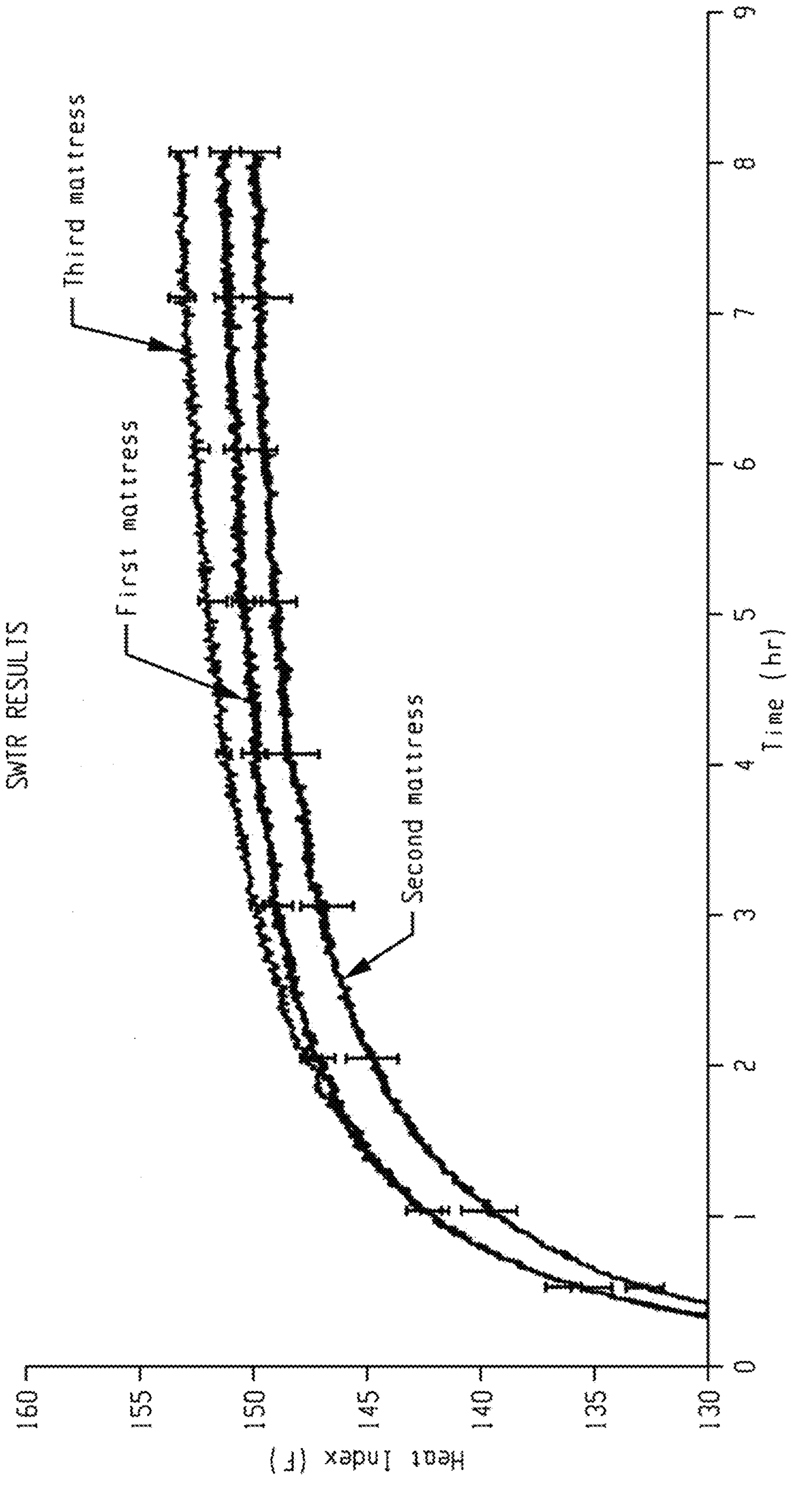
FIG. 11 graphically illustrates average heat index as a function of time comparing mattress assemblies sandwiching the thermally conductive layer between high air flow foam layers and mattress assemblies including a spacer layer underlying the thermally conductive layer in accordance with the present disclosure.

Heat index as a function of time was measured as in Example 1 for each mattress assembly with the results graphically shown in FIG. 11. In the first few hours, the mattress assembly including the 2-inch high airflow foam layers exhibited a marked decrease in the heat index by about 3° F. relative to the other two mattress assemblies. Also, throughout the remainder of the test, the mattress assemblies including the high airflow foam layers both performed better than the mattress with spacer fabric, whereas the mattress assembly including the spacer layer exhibited the highest heat index. It should be noted that in Example 1, mattress assemblies including the spacer layer in accordance with the present disclosure showed a marked improvement of about 10° F. compared to mattress assemblies without the spacer layer (see FIG. 10). The mattress with 2" of high airflow foam below the conductive layer performed best while the mattress with 1" under the conductive layer had lower performance but still exceeded the mattress with spacer fabric.

This written description uses examples to disclose the invention, including the best mode, and also to enable any person skilled in the art to make and use the invention. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A mattress assembly, comprising:

a moisture management layer comprising a moisture wicking material;

a thermally conductive layer underlying and in directed contact with the moisture management layer; and a spacer layer underlying and in direct contact with the thermally conductive layer, wherein the spacer layer comprises a three-dimensional polymeric fibrous structure including substantially planar top and bottom surfaces and substantially vertically oriented fibers extending between the planar top and bottom surfaces;

wherein the thermally conductive layer comprises a plurality of geometric openings arranged in rows and columns, wherein a plurality of slits are formed, one each, between adjacent geometric openings in a linear direction oriented along a dimension of the mattress assembly;

wherein each slit comprises an expansion cut entirely through the thermally conductive layer, the expansion cut configured to open in response to an applied load on the mattress assembly; and wherein a glue pattern of the mattress assembly is orthogonal to the linear direction, thereby allowing the slits to expand in the linear direction.

2. The mattress assembly of claim 1, wherein the thermally conductive layer is perforated.

3. The mattress assembly of claim 2, wherein the thermally conductive layer comprises foil or a composite having a thickness less than 0.0625 inches.

4. The mattress assembly of claim 1, wherein the thermally conductive layer comprises foam and thermally conductive particles embedded therein.

5. The mattress assembly of claim 4, wherein the thermally conductive particles comprise carbon, graphene, graphite, platinum, aluminum, diamond, gold, silver, silicon, tin, copper, iron, nickel, chromium, vanadium, tungsten, or combinations thereof.

6. The mattress assembly of claim 5, wherein the thermally conductive particles are combined with oxygen, halogens, carbon, or silicon.

7. The mattress assembly of claim 1, further comprising an uppermost foam layer overlying the moisture management layer, wherein the uppermost foam layer comprises a viscoelastic foam layer.

8. The mattress assembly of claim 1, wherein the spacer layer has a uniform thickness of about 0.125 inches to about 6 inches.

9. The mattress assembly of claim 1, wherein the moisture management layer, the thermally conductive layer and the spacer layer overly one or more foam layers.

10. The mattress assembly of claim 1, wherein the moisture management layer, the thermally conductive layer and the spacer layer overly an innerspring mattress core.

11. The mattress assembly of claim 1, wherein the moisture management layer is a non-woven porous fabric layer having a thickness less than 0.1 inches.

12. A mattress assembly, comprising:

a first high airflow foam layer configured to provide an air flow equal to or greater than 6 $ft^3$/min;

a perforated thermally conductive layer proximate to a sleeping surface; and a second high airflow foam layer configured to provide an air flow equal to or greater than 6 $ft^3$/min, wherein the thermally conductive layer is in direct contact with and is sandwiched between the first and second high airflow layers;

wherein the perforated thermally conductive foam layer comprises a plurality of geometric openings arranged in rows and columns, wherein a plurality of slits are formed, one each, between adjacent geometric openings in a linear direction oriented along a dimension of the mattress assembly;

wherein each slit comprises an expansion cut entirely through the perforated thermally conductive foam layer, the expansion cut configured to open in response to an applied load on the mattress assembly; and wherein a glue pattern of the mattress assembly is orthogonal to the linear direction, thereby allowing the slits to expand in the linear direction.

13. The mattress assembly of claim 12, wherein the perforated thermally conductive foam layer comprises foil or a composite having a thickness less than 0.0625 inches.

14. The mattress assembly of claim 12, wherein the perforated thermally conductive foam layer is adhesively coupled with patterned adhesive comprising the glue pattern on the second high airflow layer, wherein the patterned adhesive includes a linear spaced apart and parallel application of an adhesive extending from side-to-side to prevent binding of the slit during use.

15. The mattress assembly of claim 12, wherein the slit is formed between adjacent geometric openings in the linear direction oriented along a width dimension of the mattress assembly.

16. The mattress assembly of claim 12, wherein the thermally conductive foam layer comprises thermally conductive particles embedded therein.

17. The mattress assembly of claim 16, wherein the thermally conductive particles comprise carbon, graphene, graphite, platinum, aluminum, diamond, gold, silver, silicon, tin, copper, iron, nickel, chromium, vanadium, tungsten, or combinations thereof.

18. The mattress assembly of claim 16, wherein the thermally conductive particles are combined with oxygen, halogens, carbon, or silicon.

19. A process for reducing heat index in a mattress assembly comprising:

sandwiching a perforated thermally conductive foam layer between first and second foam layers, wherein the first foam layer has a moderate airflow of 2 to 5 $ft^3$/min or a high air flow of at least 6 $ft^3$/min or greater, and the second foam layer has a high air flow of at least 6 $ft^3$/min or greater; and providing the sandwiched perforated thermally conductive foam layer proximate to a sleeping surface within a mattress assembly, wherein the perforated thermally conductive layer comprises a thermally conductive material having a thermal conductivity greater than 5 watts per meters-Kelvin;

wherein the perforated thermally conductive foam layer comprises a plurality of geometric openings arranged in rows and columns, wherein a plurality of slits are formed, one each, between adjacent geometric openings in a linear direction oriented along a dimension of the mattress assembly;

wherein each slit comprises an expansion cut entirely through the perforated thermally conductive foam layer, the expansion cut configured to open in response to an applied load on the mattress assembly; and wherein a glue pattern of the mattress assembly is orthogonal to the linear direction, thereby allowing the slits to expand in the linear direction.

20. The process of claim 19, wherein the perforated thermally conductive foam layer comprises foil or a composite having a thickness less than 0.0625 inches.

21. The mattress assembly of claim 19, wherein the thermally conductive foam layer comprises thermally conductive particles embedded therein.

22. A mattress assembly, comprising:

a first moderate airflow foam layer configured to provide an air flow equal to or greater than 2 $ft^3$/min to 5 $ft^3$/min;

a perforated thermally conductive foam layer proximate to a sleeping surface; and a second high airflow foam layer configured to provide an air flow equal to or greater than 6 $ft^3$/min, wherein the thermally conductive layer is in direct contact with and is sandwiched between the first and second high airflow layers;

wherein the perforated thermally conductive foam layer comprises a plurality of geometric openings arranged in rows and columns, wherein a plurality of slits are formed, one each, between adjacent geometric openings in a linear direction oriented along a dimension of the mattress assembly;

wherein each slit comprises an expansion cut entirely through the perforated thermally conductive foam layer, the expansion cut configured to open in response to an applied load on the mattress assembly; and wherein a glue pattern of the mattress assembly is orthogonal to the linear direction, thereby allowing the slits to expand in the linear direction.

23. The mattress assembly of claim 22, wherein the perforated thermally conductive foam layer comprises foil or a composite having a thickness less than 0.0625 inches.

24. The mattress assembly of claim 22, wherein the thermally conductive layer comprises thermally conductive particles embedded therein.

25. The mattress assembly of claim 24, wherein the thermally conductive particles comprise carbon, graphene, graphite, platinum, aluminum, diamond, gold, silver, silicon, tin, copper, iron, nickel, chromium, vanadium, tungsten, or combinations thereof.

26. The mattress assembly of claim 24, wherein the thermally conductive particles are combined with oxygen, halogens, carbon, or silicon.

27. The mattress assembly of claim 22, wherein the slit is configured to open in response to an applied load on the mattress assembly.

28. The mattress assembly of claim 22, wherein the perforated thermally conductive layer is adhesively coupled with patterned adhesive comprising the glue pattern on the second high airflow layer, wherein the patterned adhesive extends from side-to-side to prevent binding of the slit during use.

* * * * *